United States Patent [19]

Coles et al.

[11] 4,079,439
[45] Mar. 14, 1978

[54] LOADCENTER HAVING A DUAL PURPOSE NEUTRAL RAIL

[75] Inventors: Sidney J. Coles, Carlisle; John G. Bednar, Toronto, both of Canada

[73] Assignee: Westinghouse Canada Limited, Hamilton, Canada

[21] Appl. No.: 691,680

[22] Filed: Jun. 1, 1976

[30] Foreign Application Priority Data

Jun. 11, 1975 Canada .................................. 229119

[51] Int. Cl.² ............................................ H02B 1/04
[52] U.S. Cl. .............................. 361/355; 339/198 N; 174/70 B
[58] Field of Search ................. 174/70 B, 71 B, 68 B; 339/198 N; 361/355, 358, 361, 363, 353, 354; 200/51 R

[56] References Cited

U.S. PATENT DOCUMENTS

| | | | |
|---|---|---|---|
| 3,210,716 | 10/1965 | Meacham | 174/70 B |
| 3,218,519 | 11/1965 | Casey | 361/353 |
| 3,315,215 | 4/1967 | Kulka | 339/198 N |
| 3,423,724 | 1/1969 | Clement | 339/198 N |
| 3,848,161 | 11/1974 | Clement | 361/355 |

FOREIGN PATENT DOCUMENTS

| | | | |
|---|---|---|---|
| 1,280,379 | 11/1961 | France | 339/198 N |
| 218,745 | 7/1942 | Germany | 339/198 N |

Primary Examiner—Gerald P. Tolin
Attorney, Agent, or Firm—Robert E. Converse, Jr.

[57] ABSTRACT

This invention relates to a distribution panelboard such as might be used for electrical service entrances. The panelboard differs from prior art designs in that the neutral rail which is generally found in previous designs at the top or bottom of the panelboard is located on each side of the panelboard. In this manner it serves to conduct the neutral currents to the neutral load and at the same time functions to anchor one end of a distribution circuit breaker thereto.

9 Claims, 4 Drawing Figures

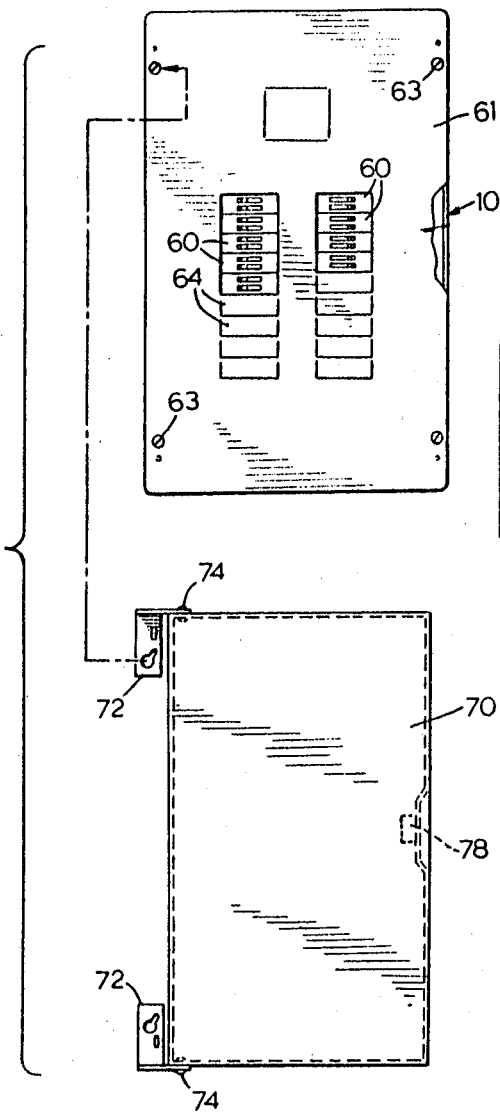
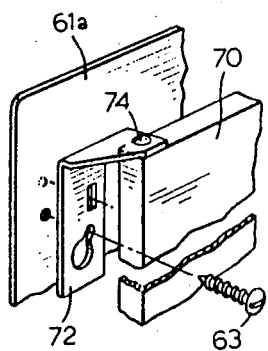
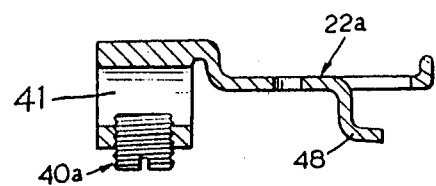
FIG. 2
FIG. 3
FIG. 4

LOADCENTER HAVING A DUAL PURPOSE NEUTRAL RAIL

BACKGROUND OF THE INVENTION

Panelboards of the lower power rating such as would be found in domestic residences have in the past generally had a configuration which is more or less standard throughout the industry. Electrical power which is being fed into the panelboard is arranged to be fed into the panelboard by means of heavy electrical conducting cables which are passed through the walls of the panelboard into the topmost area to a main circuit breaker device. The incoming neutral conductor is generally connected to a neutral rail which will be found at either the top or the bottom of the panelboard. Circuit distribution from the main breaker device is generally by means of electrical conductors which branch from the main circuit breaking device which has in the past generally been physically separated from the smaller distribution circuit breaking devices, into the lower section of the distribution section of the panelboard. Circuit breaking devices of a lower current capacity are used at the distribution level to control the current in the distribution circuits. The neutral conductor for each distribution circuit must of course be securely connected to the provided neutral rail.

When an electrician wishes to connect any circuit into the prior art panelboards, he must of necessity provide a lead of sufficient length to pass through an aperture in the wall of the panelboard, so that the "live" or "hot" wire is connected to the protected or "fused" terminal of the circuit breaking device, whilst the neutral conductor must of necessity be formed and bent around a circuitous path to connect to the neutral bus assembly. This necessitates leaving a substantial extra length of conductor to be passed through the aperture in the enclosure to ensure that sufficient wire will be left to make a neutral connection for the distribution conductor.

SUMMARY OF THE INVENTION

This invention relates to a novel panelboard structure wherein circuit breakers are used to monitor and control the incoming current to a panelboard, as well as the current flowing in the various distribution conductors connected into the panelboard. The panelboard is similar in external appearance to panelboards of prior art designs, however the process of connecting distribution cables and incoming feed cables into the panelboard itself differs from prior art designs. This invention will function with panelboards which will accept the common stab type circuit breakers or the screw in type circuit breaker. Incoming power is fed via cable to the "main" circuit breakers located at the top of the panelboard and the power is thence distributed via bus bar arrangement to the distribution circuit breakers located in the lower distribution circuit breaker area of the panelboard. The distribution circuit breakers are mounted in the distribution section of the panelboard by securing one end of the circuit breaker to a hook which is carried on a rail such that the circuit breaker may swing about the hook and be fastened to the live buse by a screw or stab connection. When making connections to the circuit breaker, the incoming distribution cable is passed through a suitable aperture in the enclosure and the "live" or "hot" wire is connected to the "live" terminal of the above mounted circuit breaker. The neutral wire will be connected in a suitable manner to the neutral rail which serves a dual purpose. The neutral rail in this invention functions to connect all the neutral wires together on the same bus and at the same time connect the main incoming neutral line to the bus, as well as to provide the hooks which secure one side of the circuit breaker to the panelboard. Thus, the neutral conductor for the distribution circuit is clamped to the neutral rail via a screw or some other suitable connecting means in an area adjacent the hook to which that particular circuit breaker was mounted. It it is necessary to ground the distribution cable as well, suitable ground clamping screws will be provided in the main panelboard body adjacent the neutral rail to facilitate making a ground connection thereto.

BRIEF DESCRIPTION OF THE DRAWINGS

FIG. 2 is a view of the cover plate and the door which may be used to enclose the panelboard of FIG. 1;

FIG. 3 is a perspective view of the hinge attachment of a cover plate for the panel; and FIG. 4 is a sectional view on lines IV-IV (FIG. 1) showing an alternative extrusion shape for the neutral rail.

DESCRIPTION OF THE PREFERRED EMBODIMENT

Figure 1:
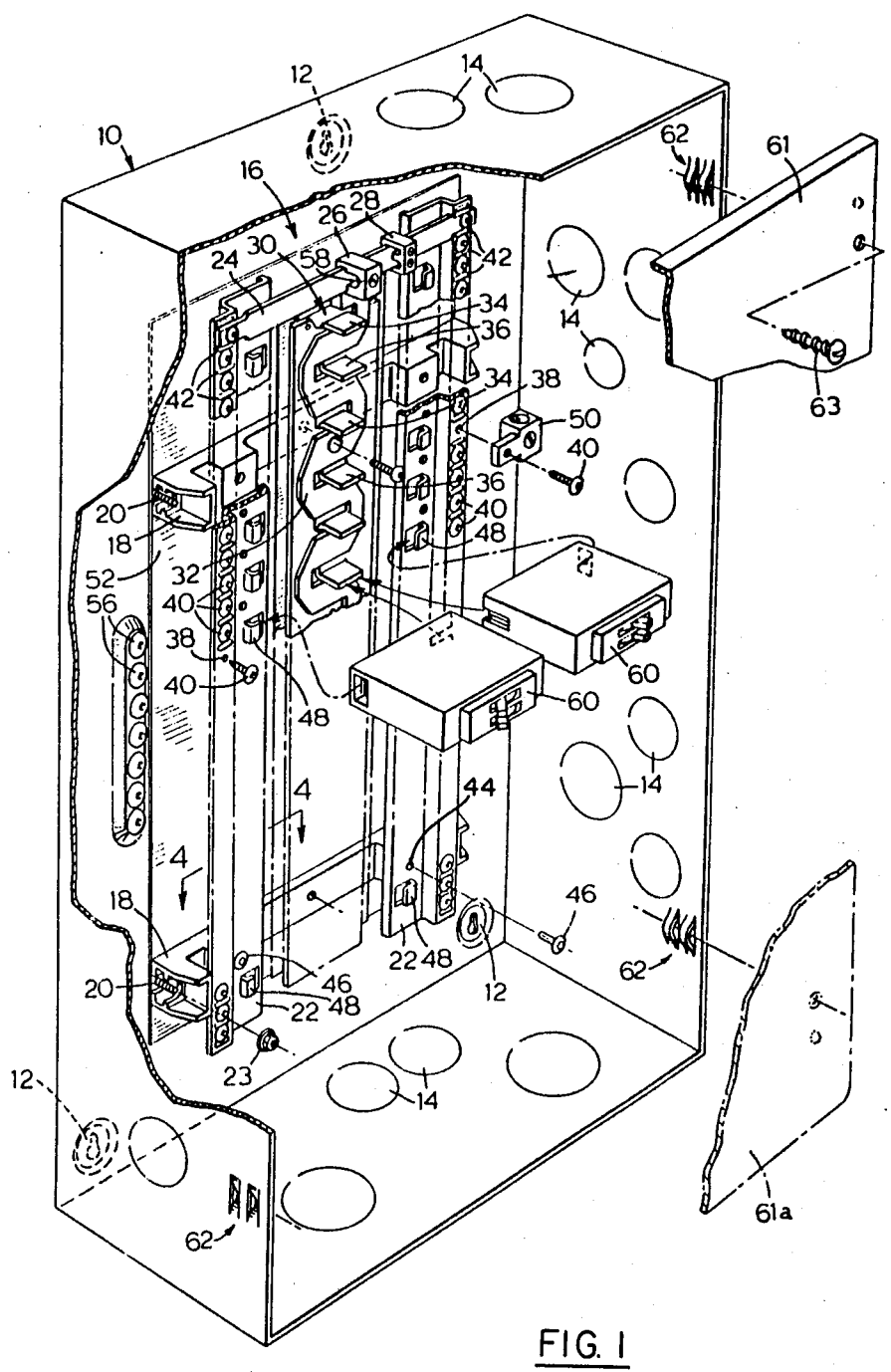
FIG. 1 is a view of the complete panelboard which is the subject of this invention.

Referring now to FIG. 1, it will be seen that a box-like metallic enclosure 10 is provided with three mounting areas 12 which will permit the box-like enclosure 10 to be mounted on a suitable mounting surface. It is envisaged that the most usual method of mounting the box-like enclosure 10 will be by means of screws. Box-like enclosure 10 is provided with convenient knock-out punchings 14 in the bottom and top surfaces thereof and similarly knock-out punchings will be formed in the sides of the enclosure 10 to provide suitable access holes for conductors which will subsequently pass therethrough.

Mounted in the box-like enclosure 10 will be a circuit breaker and bus bar assembly panel designated 16. The panel 16 is mounted on a pair of insulating members 18 which are fastened by suitable means to the box-like enclosure 10. In this instance, studs 20 and nuts 23 have been illustrated, however it is realized that rivets or other suitable means may well perform this function in a satisfactory manner. A sheet of insulating material 52 lies between members 18 and box 10. Mounted on insulating members 18 are a pair of side rails 22 which may be fastened to the insulating member in any suitable manner. Members 22 are formed from an electrically conductive material for instance, extruded aluminum, and a bus bar 24 is shown connecting the top sections of the two rails 22 together in this instance by means of screws. Bar 24 is provided with a pair of terminal connectors 26 and 28 which may be slid along bar 24 to any suitable position.

In the central area, a bus bar assembly 30 is mounted on the insulating members 18. Bus bar 30 is composed of an insulating member 32 and two sets of bus bars whose stabs are alternately located in the insulating member 32. Stabs 34 will be connected to one phase of the incoming supply while stab members 36 will be connected to the second phase or second incoming line of the power supply. The bus bar assembly 30 does not form part of this invention and for this reason will not be described in any further detail as far as its mechanical construction is concerned.

The side rails 22, however, form the main point of the invention of this application and will be described in somewhat greater detail. Members 22 will preferably be fabricated from aluminum extrusions. Near the outer edge, rails 22 are provided with holes 38 which are provided for screws such as those shown at 40 which are used to connect the neutral wire in the distribution cable to the neutral rail 22. Between the holes 38 is a raised portion such as indicated at 42 which is used to assure that the neutral wire will be forced under the head of the screw which is being fed into the appropriate hole 38. Also provided in the central area of the neutral rail 22 is a series of holes 44, two of which are used for pop rivets 46 to secure the neutral rail 22 to the insulator members 18.

The hook portions of the neutral rails designated 48 are formed by a stamping operation to provide the contour as shown. The hooks 48 will bear a similar appearance to mounting hooks used in other prior art designs, however, it is believed that the provision of hooks on the neutral side rails 22 is novel. The neutral rail may be provided with special heavy duty connectors such as that shown at 50 for providing a neutral connection to a distribution cable which is of a larger current capacity than the standard conductor used in a domestic circuit, such as would be used for range or dryer cable. The connecter 50 is of a type which will carry more current than the screw type connector 40 shown on the drawing, however connector 50 itself forms no part of this invention.

The insulating material 52, such as Mylar R, separates the bus bar section 30 from the box-like enclosure 10 and similarly another insulating sheet 53 lies between bus bar assembly 30 and supports 18. These insulating members may be required by local regulatory codes etc. and are provided merely as insulating barriers. The advantages of the distribution panelboard of this invention are as follows.

It will be seen that the neutral bus rails 22 perform two functions. Firstly, the rails 22 carry neutral current to the main bus bar 24 and secondly provide a mounting hook 48 for the circuit breakers of this invention. The neutral rails 22 may be cropped at any convenient length, which suits the manufacturer of the panelboard for the particular application to the panelboard being manufactured. Although not evident or described in this disclosure previously, this convenient feature is well matched to the bus bar assembly 30 which is also of such design that it may be cropped at any convenient length. Thus, in order to change a rating of the panelboard, it is only necessary to change the longitudinal dimensions of the enclosure, the rails 22 and the bus bar assembly 28 in order to accomodate more breakers and thus increase the size and rating of the panelboard.

The two neutral rails 22 are connected via bus bar 24 on which is fitted sliding connectors 26. This method of clamping allows the heavy incoming neutral cable to be connected to the bus bar 26 at any convenient location and avoids the task of forcing a heavy cable into a specific area for connection to a main bus clamp.

In operation, the distribution panelboard functions as follows. The incoming supply power cable will generally be composed of two line conductors and one neutral conductor plus a ground conductor. This incoming cable will be passed through a suitable knock-out punching in the panel, it being understood that a specified connecter will be supplied to protect the supply cable where entrance is made through the knock-out aperture.

The ground conductor on the supply cable may be fastened to the panelboard at any convenient ground location, such as terminal 56 in FIG. 1. The neutral cable will be connected into sliding connector 26 which will be secured to bar 24 at any convenient location. It will be seen that the screw 58 therein is provided to press the incoming neutral cable against the bus bar 24 in such a manner as to make a good electrical connection as well as to mechanically secure the cable and sliding connector to the bus bar 24 so that it will not move in subsequent operation.

The incoming circuit breakers will be connected at the topmost portion of the panelboard to stabs 34 and 36 as shown on the top of FIG. 1. The circuit breaking devices (there may be a multiplicity of breakers or there may be a multi-pole breaker provided in this area) provide current monitoring and control for the total current to be carried by the panelboard. The cables bearing the two "live" or "hot" supply conductors will be connected to one or the other terminals of the circuit breaking devices so that terminal 34 will be fed via one circuit breaker from one side of the "hot" incoming line and stab 36 will be fed by the alternate incoming line. In this manner, all the stabs 34 carry a voltage which is common to one of the incoming lines and stabs 36 carry the voltage of the other incoming line.

The distribution circuit breakers are connected as follows. A circuit breaker 60 of the proper current rating is mated with the hook 48 at a suitable location on the circuit breaker. The circuit breaker is then rotated about hook 48 until its stab connection engages the proper stab terminal (either of the stabs 34 or 36). The outgoing distribution cable to be connected to this distribution circuit breaker is passed via a suitable connector through an aperture in the side of the box-like enclosure 10. After protective shielding of the cable is removed to expose the required three conductors, i.e., the ground, the neutral and the "live" line, it will generally be found that the longest line required for connection will be the "live" line, thus the electrician's decision as to the required length of cable necessary for proper connection inside the panel must be made bearing this in mind. The "live" conductor will be connected to the terminal of the circuit breaker such as the breaker shown at 60 and immediately adjacent this terminal, the neutral conductor of the distribution cable will be connected under a screw (such as shown at 40) to the neutral rail.

The ground wire will be secured under a screw such as 56 as shown in the box-like enclosure 10.

To an electrician or one skilled in the art, it will be immediately apparent that a saving results by this construction. In all previous designs of panelboards the applicant has been aware of, the neutral conductor has traditionally been the longest conductor of the three wires in distribution cable bundle connected in the interior of the panelboard. It has to be passed to the top or bottom extremity of the panelboard in order to be connected to a common neutral bus. In this instance, the neutral conductor is connected to the neutral rail 22 in an area immediately adjacent the circuit breaker which is feeding its "line" or "hot" conductor. Because the neutral conductor is shortened, a saving in the cost of the cable itself is immediately realized.

Secondly, in the case where an alteration or an update is being made on the circuitry being connected into a panelboard, it is now very easily seen which neutral conductor is paired with the corresponding "line" or "hot" conductor of the common distribution cable. It will be appreciated by those skilled in the art that this was not always necessarily an easy task to perform in the past.

The trim and cover for the box-like enclosure 10 will be seen in FIG. 2. Portions of the trim member 61 are shown on FIG. 1. The trim member 61 is provided with four appropriate holes provided to accept fastening screws 63 which are suitably received in the provided fastening areas 62 of the box-like enclosure 10. The fastening areas 62 of the panelboard are formed by lancing a pair of ribbons of metal as shown and subsequently deforming the ribbons inwardly to form a recess for mounting screw 63. Mounting screws 63 have sufficient pitch between the threads of the screw to receive the ribbons of deformed material between the threads of the screw.

The trim member 61 is shown mounted on box-like enclosure 10. Member 61 is provided with a central portion where blanks 64 have been removed to allow access to circuit breaker actuators 60. The trim is held in place on box-like enclosure 10 by means of screws 63. An alternative flangeless trim member 61a is shown in FIG. 1.

If it is desired to have a cover for the panelboard, the cover 70 as shown in FIG. 2 provides convenient protection for the panelboard.

Cover 70 is provided with two hinges 72 which are hingedly connected to cover 70 by means of pins 74. Hinges 72 are provided with slotted openings which opening is enlarged at one end to receive the heads of screws 63.

To install the cover, the two appropriate screws 63 are slackened off so that the heads protrude somewhat above the face of trim member 61. The hinge plates 72 are passed over the heads of screws 66 and the cover 70 and hinges 74 are dropped so that the hinge plates 74 are held captive by the screw heads in the small slots. For more detail, please refer to FIG. 3.

The door 70 may be swung open and may be held closed by latch means 78 which may be of a magnetic or mechanical type.

An alternative construction for neutral rails 22 is shown in FIG. 4 which is essentially a cross-sectional view of the extruded assembly.

The neutral rail shown as 22a is provided with the circuit breaker anchor hook 48 as previously, but the essential difference with the construction shown in FIG. 4 lies in the connection of the neutral conductor into the rail. Instead of securing the neutral conductor under the head of a screw (such as 40 as illustrated in FIG. 1), the neutral conductor is passed into a suitable aperture 41 drilled or formed in rail 22a and is subsequently clamped in aperture 41 by set screw 40a. This construction may be necessary in some instances where an alternate type of conductor in the distribution cable may be used or preference by the local electrician dictates this type of connection.

The structural strength and finish of various components has not been given in this description, however it is believed that the assembly will be made to conform with standard electric codes in areas where installation of the panelboard is contemplated.

What is claimed is:

1. A distribution panelboard assembly comprising a box-like enclosure having a bus bar assembly mounted in the interior of said box-like enclosure in spaced insulating relationship with the mounting surface of said enclosure, distribution bus means extending in a vertical direction having circuit breaker feed means at the centre of said bus bar assembly extending in a vertical direction and arranged at predetermined equal spaced intervals for energizing circuit breakers to be connected thereto, a parir of metallic side rails mounted in said enclosure in spaced insulating relationship with the mounting surface of said enclosure, said side rails being mounted in a spaced parallel relationship, and being spaced equidistantly on either side of said distribution bus means, said side rails having circuit breaker anchor hooks formed therein at evenly spaced intervals corresponding to said predetermined spaced intervals, each side rail also having a plurality of circuit conductor connection means integrally incorporated therein, said conductor connection means extending in a vertical direction spaced a predetermined distance from said anchor hooks remote from said distribution bus means and numbering at least two conductor connection means per hook.

2. A distribution panelboard assembly, comprising:
a box-like enclosure;
a bus bar assembly mounted in the interior of said box-like enclosure and insulated therefrom; said assembly comprising distribution bus means extending in a vertical direction and having circuit breaker feed means at the center of said bus bar assembly, said feed means extending perpendicular to said distribution bus means and arranged at predetermined equal spaced intervals for energizing circuit breakers to be connected thereto; and
a pair of metallic side rails mounted in said enclosure in spaced insulating relationship with the mounting surface of said enclosure, said side rails being mounted in spaced parallel relationship to each other and being spaced equidistantly on either side of said distribution bus means, said side rails having circuit breaker anchor hooks formed therein at evenly spaced intervals corresponding to said predetermined intervals, each side rail having a plurality of circuit conductor connection means thereon spaced a predetermined distance from said anchor hooks remote from said distribution bus means.

3. A distribution panelboard, comprising:
an enclosure;
a phase bus assembly insulatingly mounted in said enclosure and extending in a vertical direction, said phase bus assembly comprising means for connecting the load side terminals of main circuit breakers and to line side terminals of feeder circuit breakers; and
a pair of neutral side rails insulatingly mounted in said enclosure and spaced in parallel relationship equidistantly on either side of said phase bus assembly; said side rails comprising circuit breaker anchor hooks adapted to mechanically engage the housings of associated main and distribution circuit breakers, said neutral side rails futher comprising means for connecting to neutral conductors of distribution cables and means for connecting to the neutral conductors of main cables, both of said connecting means being mounted on said neutral side rails.

4. A distribution panelboard as recited in claim 3 wherein said main cable neutral conductor connecting means comprises a bus bar electrically connecting said side rails and a connector slidingly attached to said bus bar and adapted to receive the neutral conductor of a main cable.

5. A distribution panelboard as recited in claim 3 wherein said circuit breaker connecting means of said phase bus assembly are equally spaced at predetermined intervals and said anchor hooks are equally spaced at intervals corresponding to said predetermined intervals.

6. A distribution panelboard as recited in claim 5 wherein said circuit breaker connecting means of said phase bus assembly are equally spaced at predetermined intervals and said anchor hooks are equally spaced at intervals corresponding to said predetermined intervals.

7. A distribution panelboard as recited in claim 6 comprising at least two distribution cable neutral conductor connecting means per anchor hook.

8. A distribution panelboard as recited in claim 6 wherein said distribution cable neutral conductor connecting means comprise a plurality of screws threaded into said side rails, each screw being associated with one of said anchor hooks.

9. A distribution panelboard as recited in claim 8 comprising at least two of said screws per anchor hook.

* * * * *